United States Patent
Suzuki et al.

(10) Patent No.: US 11,640,165 B2
(45) Date of Patent: May 2, 2023

(54) REMOTE DRIVING SERVICE PROCESSING DEVICE

(71) Applicant: TOYOTA JIDOSHA KABUSHIKI KAISHA, Toyota (JP)

(72) Inventors: Yuji Suzuki, Toyota (JP); Mutsumi Matsuura, Kazaki (JP); Tomoaki Miyazawa, Nagoya (JP); Toshiki Kindo, Yokohama (JP); Shunsuke Tanimori, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 363 days.

(21) Appl. No.: 16/931,499

(22) Filed: Jul. 17, 2020

(65) Prior Publication Data

US 2021/0041864 A1 Feb. 11, 2021

(30) Foreign Application Priority Data

Aug. 7, 2019 (JP) .............................. JP2019-145680

(51) Int. Cl.
*G05D 1/00* (2006.01)
*G06Q 50/30* (2012.01)
*G06Q 20/10* (2012.01)
*G06Q 20/08* (2012.01)

(52) U.S. Cl.
CPC ......... *G05D 1/0011* (2013.01); *G06Q 20/085* (2013.01); *G06Q 20/102* (2013.01); *G06Q 50/30* (2013.01); *G05D 2201/0212* (2013.01)

(58) Field of Classification Search
CPC ......... G05D 1/0011; G05D 2201/0212; G06Q 20/085; G06Q 20/102; G06Q 50/30; G08G 1/09; H04L 67/12

USPC .......................................................... 701/23
See application file for complete search history.

(56) References Cited

U.S. PATENT DOCUMENTS

| | | | |
|---|---|---|---|
| 10,157,364 B1* | 12/2018 | Koeppel | G06Q 30/0613 |
| 2014/0207535 A1* | 7/2014 | Stefan | G07C 5/008 |
| | | | 701/1 |
| 2015/0324729 A1* | 11/2015 | Lord | G06Q 10/06 |
| | | | 705/7.15 |
| 2016/0078394 A1* | 3/2016 | Fuldner | H04W 4/023 |
| | | | 705/7.15 |
| 2017/0039668 A1* | 2/2017 | Luke | G07C 5/0808 |

(Continued)

FOREIGN PATENT DOCUMENTS

| | | |
|---|---|---|
| GN | 109564730 A | 4/2019 |
| JP | 2018-206187 A | 12/2018 |

*Primary Examiner* — Vivek D Koppikar
*Assistant Examiner* — Dominick Mulder
(74) *Attorney, Agent, or Firm* — Oliff PLC

(57) ABSTRACT

A remote driving service processing device includes a general user terminal by which a remote driving service is requested for moving a vehicle to a destination, a remote operation terminal by which the vehicle is remotely operated, and a server that, if the vehicle does not satisfy a requirement for ending the remote driving service when the vehicle arrives at the destination, sends an and permission request to end the remote driving service, which is received from the remote operation terminal, to the general user terminal, and, when receiving a consent to end the remote driving service from the general user terminal as a response to the end permission request, sends the consent to end to the remote operation terminal and ends the remote driving service.

11 Claims, 3 Drawing Sheets

(56) References Cited

U.S. PATENT DOCUMENTS

| | | | |
|---|---|---|---|
| 2018/0074490 A1* | 3/2018 | Park | G06Q 20/3224 |
| 2018/0293521 A1* | 10/2018 | Akselrod | G06Q 10/025 |
| 2019/0064806 A1* | 2/2019 | Nix | G05D 1/0212 |
| 2019/0129411 A1* | 5/2019 | Giessel | B64C 39/024 |
| 2019/0212732 A1 | 7/2019 | Takanashi et al. | |
| 2019/0316926 A1* | 10/2019 | Wang | G01C 21/3438 |
| 2019/0384277 A1* | 12/2019 | Otaka | G05D 1/0038 |
| 2021/0027411 A1* | 1/2021 | Kindo | G06Q 50/265 |
| 2021/0216066 A1* | 7/2021 | Shimotani | B60W 50/14 |
| 2022/0011768 A1* | 1/2022 | Matsunaga | G08G 1/16 |
| 2022/0342414 A1* | 10/2022 | Takimoto | G05D 1/0011 |

* cited by examiner

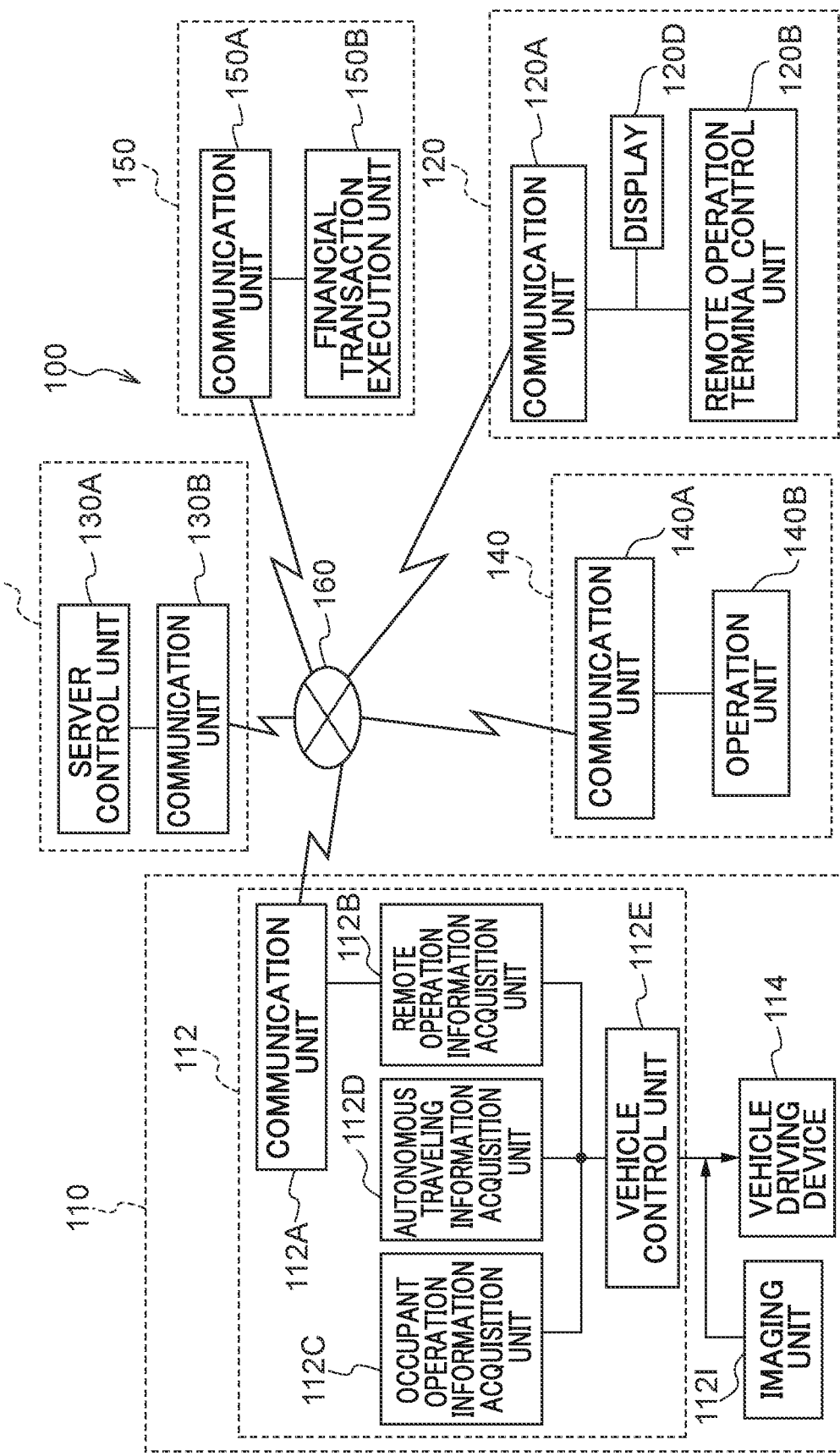

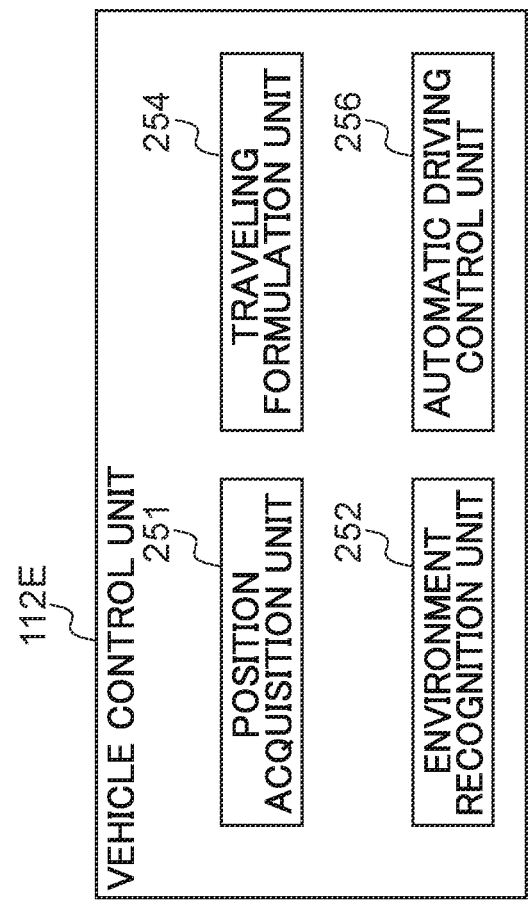

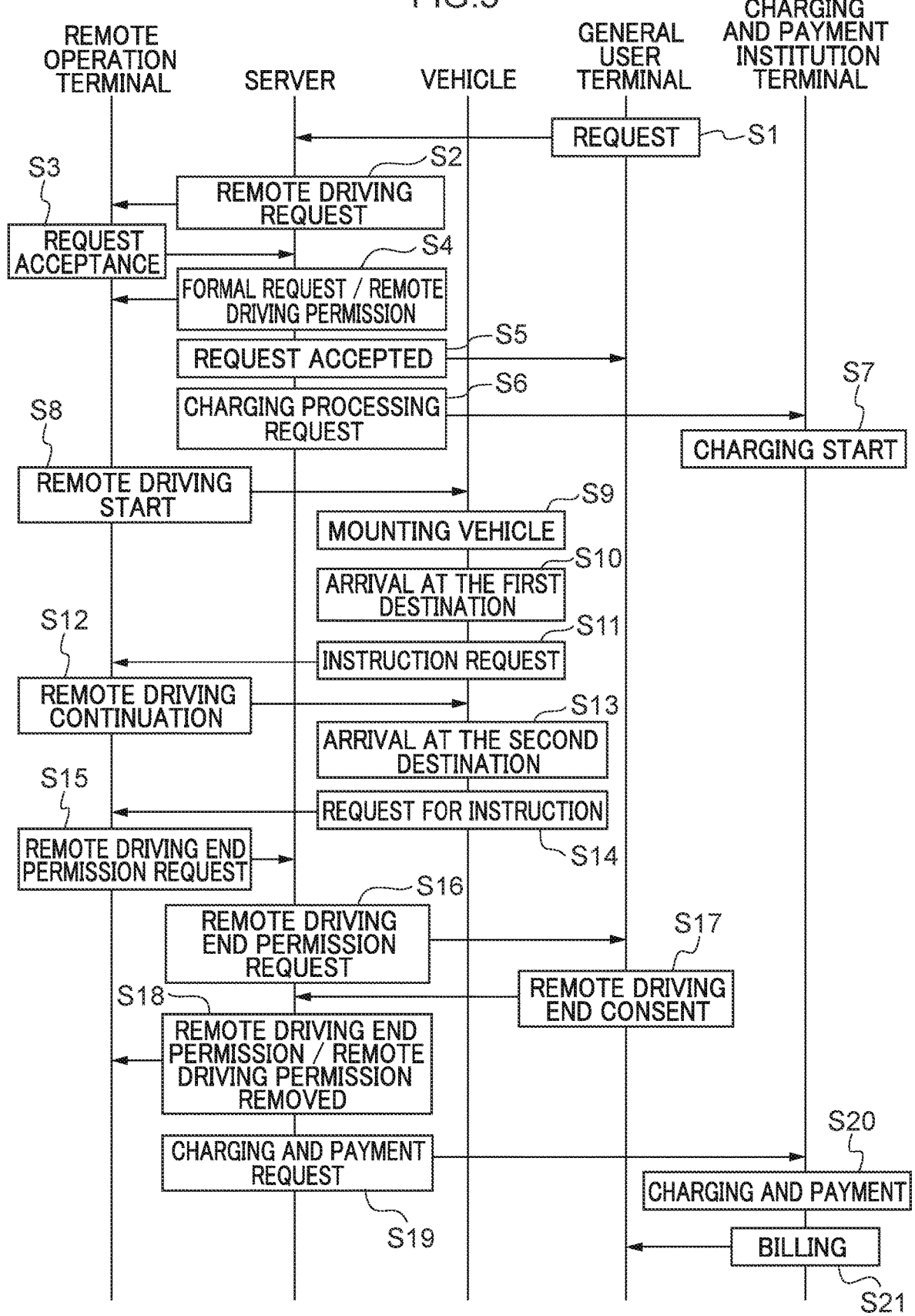

REMOTE DRIVING SERVICE PROCESSING DEVICE

CROSS-REFERENCE TO RELATED APPLICATION

This application is based on and claims priority under 35 USC 119 from Japanese Patent Application No. 2019-145680 filed on Aug. 7, 2019, the disclosure of which is incorporated by reference herein.

BACKGROUND

Technical Field

The present disclosure relates to a remote driving service processing device.

Related Art

A service for transporting people or luggage by remote driving in which a vehicle is operated by a remote driver located in a remote place is being considered.

Japanese Patent Application Laid-Open No. 2018-206187 (Patent Document 1) discloses an invention of a remote driving control device that performs a remote driving service for transporting a person using a vehicle.

According to the invention described in Patent Document 1, it is possible to determine a position where the vehicle should be stopped from plural stop position candidates located near the destination. This allows for flexibility in service operation. However, if the remote driving service includes services other than moving to the destination, such as unloading at the destination, even if the vehicle arrives at the position where the vehicle should be stopped, the remote driving service cannot be ended before the service other than moving is completed. As a result, there is a possibility that the remote driving service is continued needlessly and the charging and payment of the remote driving service is not smoothly performed.

SUMMARY

In view of the above, it is an object of the present disclosure to provide a remote driving service processing device capable of performing charging and payment of a remote driving service based on an agreement between a requester of a remote driving service and a remote driver remotely operating (remote driving) a vehicle with the remote driving service.

The remote driving service processing device according to a first aspect includes a general user terminal by which a remote driving service is requested for moving a vehicle to a destination, a remote operation terminal that remotely operates the vehicle, and a server that, if the vehicle does not satisfy a requirement for ending the remote driving service when the vehicle arrives at the destination, sends a permission request to end the remote driving service, which is received from the remote operation terminal, to the general user terminal, and, when receiving a consent to end the remote driving service from the general user terminal as a response to the end permission request, sends the consent to end to the remote operation terminal and ends the remote driving service.

According to the remote driving service processing device according to the first aspect, when the requirement for ending the remote driving service when the vehicle arrives at the destination is not satisfied, the server mediates consent between the remote driving service requester and the remote driver. Thus, the remote driving service can be ended based on the agreement between the remote driving service requester and the remote driver.

The remote driving service processing device according to a second aspect is the remote driving service processing device according to the first aspect, wherein a case in which the requirement for ending the remote driving service is not satisfied includes a case in which unloading from the vehicle at the destination is required and a case in which the occupant of the vehicle does not get off at the destination.

The remote driving service processing device according to a third aspect is the remote driving service processing device according to the first or second aspects, further including a charging and payment institution terminal for performing charging and payment for the remote driving service, and wherein the server requests the charging and payment institution terminal for charging and payment of the remote driving service when receiving the consent to end the remote driving service from the general user terminal as a response to the end permission request.

According to the remote driving service processing device according to the third aspect, the remote driving service can be settled by the charging and payment institution after the remote driving service is ended based on the agreement between the remote driving service requester and the remote driver.

As described above, according to the remote driving service processing device according to the present disclosure, it is possible to perform a remote driving service charging and payment process based on an agreement between a remote driving service requester and a remote driver.

BRIEF DESCRIPTION OF DRAWINGS

FIG. 1 is a block diagram illustrating an example of a specific configuration of a remote driving service processing device according to an embodiment of the present disclosure.

FIG. 2 is a block diagram illustrating an example of a functional configuration of a vehicle control unit.

FIG. 3 is a sequence diagram illustrating an example of a process of the remote driving service processing device according to the embodiment of the present disclosure.

DETAILED DESCRIPTION

Hereinafter, the remote driving service processing device according to the present embodiment will be described with reference to FIG. 1. FIG. 1 is a block diagram illustrating an example of a specific configuration of the remote driving service processing device 100 according to the embodiment of the present disclosure.

As shown in FIG. 1, the remote driving service processing device 100 of the present embodiment includes a vehicle 110, a remote operation terminal 120, a server 130, a general user terminal 140, and a charging and payment institution terminal 150. The vehicle 110, the remote operation terminal 120, the server 130, the general user terminal 140, and the charging and payment institution terminal 150 are connected via a network 160. The network 160 is, for example, a wired or wireless communication network using a public line such as the Internet.

The vehicle 110 includes an ECU (Electronic Control Unit) 112 that controls the traveling of the vehicle, a vehicle driving device 114 that drives the vehicle in accordance with a control signal from the ECU 112, and an imaging unit 1121 that acquires image data around the vehicle 110 for remote driving.

The ECU 112 functionally includes, as shown in FIG. 1, a communication unit 112A, a remote operation information acquisition unit 112B, an occupant operation information acquisition unit 112C, an autonomous driving information acquisition unit 112D, and a vehicle control unit 112E.

The communication unit 112A sends and receives information to and from another device. The communication unit 112A is a communication device capable of wireless communication via the network 160 by so-called V2X (vehicle-to-vehicle communication and road-to-vehicle communication).

Remote operation information acquisition section 112B acquires operation information sent from remote operation terminal 120. The operation information sent from the remote operation terminal 120 is operation information input to the remote operation terminal 120 by the remote driver.

The occupant operation information acquisition unit 112C acquires operation information input from an occupant in the vehicle. The information input from the occupant includes the steering angle, the throttle opening, the depressing strength of the brake pedal, the position of the shift lever, and the like.

The autonomous traveling information acquisition unit 112D acquires information relating to autonomous traveling. For example, the information regarding the autonomous traveling includes a control signal from another ECU, position information of the vehicle 110 acquired by a GPS (Global Positioning System), or various sensors (an imaging device, a laser radar sensor mounted on the vehicle 110, etc.). The position information of the vehicle 110 obtained by GPS or the like is sent to the server 130 and the remote operation terminal 120, and is used by the server 130 and the remote driver to grasp the position and the moving state of the vehicle 110.

The vehicle control unit 112E controls the driving of the vehicle driving device 114 based on the various types of information acquired by the remote operation information acquisition unit 112B, the occupant operation information acquisition unit 112C, and the autonomous traveling information acquisition unit 112D. For example, the vehicle control unit 112E switches between remote operation, occupant operation, and autonomous traveling based on the obtained various information.

The imaging unit 1121 is an imaging device such as a video camera that captures an image of the periphery of the vehicle 110, including the front, the left and the right sides, and the rear of the vehicle 110. Image data around the vehicle 110 acquired by the imaging unit 1121 is sent to the communication unit 120A of the remote operation terminal 120 via the communication unit 112A and the network 160. The image data sent to the communication unit 120A of the remote operation terminal 120 is displayed on the display unit 120D of the remote operation terminal 120, and serves as visual information when the remote driver performs remote driving. The display unit 120D also displays an image of the compartment of the vehicle 110. The remote driver can observe the state of the occupant from the image of the vehicle compartment displayed on the display unit 120D. In addition, the display unit 120D may have a function as a videophone that allows not only an image in the vehicle compartment to be displayed but also a two-way conversation between the occupant in the vehicle compartment and the remote driver.

As shown in FIG. 1, the remote operation terminal 120 functionally includes a communication unit 120A, a remote operation terminal control unit 120B, and a display unit 120D on which an image around the vehicle 110 is displayed. As an example, the remote operation terminal 120 includes interfaces corresponding to a steering wheel, an accelerator pedal, a brake pedal, and a shift lever, respectively, and is configured to be capable of performing the same operation as that of a real vehicle. The display unit 120D is a display device such as a liquid crystal display or an organic EL display that can display the periphery of the vehicle 110 including the front, the left and the right sides and the rear of the vehicle 110. The display unit 120D may be a kind of VR goggles that are mounted so as to cover both eyes of the remote driver and allow the remote driver to stereoscopically view an image around the vehicle 110.

The communication unit 120A is a communication device capable of performing communication via the network 160. The interface between the communication unit 120A and the network 160 may be wired or wireless.

The remote operation terminal control unit 120B controls the remote operation terminal 120. For example, the remote operation terminal control unit 120B acquires the operation information input from the remote driver, and controls the communication unit 120A to send the operation information to the server 130.

The server 130 functionally includes a server control unit 130A and a communication unit 130B, as shown in FIG. 1. The communication unit 130B is a communication device that can perform communication via the network 160. The interface between the communication unit 130B and the network 160 may be wired or wireless.

The server control unit 130A controls the server 130. For example, as described later, when a request for remote driving is made from the general user terminal 140, the server control unit 130A sends a remote driving request to the communication unit 120A of the remote operation terminal 120. Then, when the request acceptance is sent from the remote operation terminal 120, the server control unit 130A sends the formal request and the remote driving permission grant to the communication unit 120A of the remote operation terminal 120. Further, the server control unit 130A controls the communication unit 130B so as to send the request acceptance to the communication unit 140A of the general user terminal 140.

In the present embodiment, the remote operation terminal 120 to which the server 130 has given remote driving permission remotely controls the vehicle 110 via the network 160. Communication between the remote operation terminal 120 and the vehicle 110 may be via the server 130. However, via the server 130, communication and control delays may become noticeable. Therefore, in the present embodiment, communication between vehicle 110 and remote operation terminal 120 in remote driving of vehicle 110 does not go through the server 130.

The general user terminal 140 is a personal terminal such as a PC or a portable information terminal having a communication unit 140A capable of communicating via the network 160. A general user who receives the benefit of the remote driving operates the operation unit 140B such as a mouse, a keyboard, or a touch panel to request the server 130 for the remote driving. The request by the operation of the operation unit 140B is sent from the communication unit 140A to the communication unit 130B of the server 130 via the network 160.

In addition, to the communication unit 140A of the general user terminal 140, a notification such as acceptance of the request and completion of the request is sent from the communication unit 130B of the server 130 via the network 160.

The charging and payment institution terminal 150 is a terminal of an institution such as a card company that performs charging and payment. The charging and payment institution terminal 150 is a terminal such as a PC provided with a communication unit 150A capable of communicating via the network 160 and a financial transaction execution unit 150B capable of performing charging and payment processing using a credit card or the like. The charging and payment institution terminal 150 starts a charging process associated with the remote driving service based on the charging process request sent from the server 130, as described later. Further, in accordance with the charging and payment request from the server 130, the charging and payment of the remote driving service is performed, and the amount based on the charging is charged to the general user terminal 140 requesting the remote driving service.

FIG. 2 is a block diagram illustrating an example of a functional configuration of the vehicle control unit 112E. As shown in FIG. 2, the vehicle control unit 112E includes a position acquisition unit 251, an environment recognition unit 252, a travel plan formulation unit 254, and an automatic driving control unit 256. Each functional configuration is realized by the vehicle control unit 112E reading an execution program stored in the storage device and executing the program.

The position acquisition unit 251 has a function of acquiring the current position of the vehicle 110. The position acquisition unit 251 acquires position information using a GPS or the like.

The environment recognition unit 252 has a function of recognizing a traveling environment around the vehicle 110. The environment recognition unit 252 acquires the traveling environment of the vehicle 110 as traveling environment information from sensor signals from various sensors mounted on the vehicle 110. The "traveling environment information" includes the weather, brightness, width of the traveling road, obstacles, and the like around the vehicle 110.

The travel plan formulation unit 254 has a function of formulating a travel plan of the vehicle 110 from the departure place to the destination via one or more transit points.

The automatic driving control unit 256 has a function of causing the vehicle 110 to travel according to a planned travel plan while considering the position information and the travel environment information.

FIG. 3 is a sequence diagram illustrating an example of a process of the remote driving service processing device 100 according to the present embodiment. The remote driving service according to the present embodiment can stop vehicle 110 at plural destinations. In FIG. 3, as an example, the vehicle 110 is stopped at two locations, that is, a first destination and a second destination different from the first destination. However, the vehicle 110 may be stopped at two or more locations.

In step S1, a request for remote driving is sent from the general user terminal 140 to the server 130.

In step S2, a request for remote driving is sent from the server 130 to the remote operation terminal 120. Then, in step S3, a request acceptance is sent from the remote operation terminal 120 to the server 130.

In step S4, the server 130 gives the remote operation terminal 120 a formal request for remote driving and the remote driving permission for remotely operating the vehicle 110. After the permission in step S4, communication regarding the remote driving operation on the remote operation terminal 120 can be performed between the remote operation terminal 120 and the vehicle 110 via the network 160 without using the server 130. In step S5, the server 130 sends a request acceptance to the general user terminal 140.

In step S6, a charging processing request is sent from server 130 to charging and payment institution terminal 150. In step S7, a charging process is started by an operation on the charging and payment institution terminal 150.

In step S8, the remote driving of the vehicle 110 is started according to the operation from the remote operation terminal 120. Then, in step S9, a person or luggage is mounted on the vehicle 110.

In step S10, the vehicle 110 arrives at the first destination. Then, in step S11, an instruction request is sent from the vehicle 110 to the remote operation terminal 120. The instruction request in step S11 is sent when the ECU 112 of the vehicle 110 determines that the position information acquired by the vehicle 110 by GPS or the like matches the first destination.

In the example shown in FIG. 3, the vehicle is going to the second destination after passing through the first destination. Therefore, in step S12, the remote operation terminal 120 sends the remote driving continuation to the vehicle 110.

In step S13, the vehicle 110 arrives at the second destination. Then, in step S14, an instruction request is sent from the vehicle 110 to the remote operation terminal 120. The instruction request in step S14 is sent when the ECU 112 of the vehicle 110 determines that the position information acquired by the vehicle 110 by GPS or the like matches the second destination.

The example shown in FIG. 3 is when a service other than moving to the destination such as unloading is requested at the second destination, or when the occupant cannot get off because the occupant is sleeping on the vehicle 110 or the like, so that the requirement for ending the remote driving service is not satisfied. An example of when a service other than moving to the destination is requested, apart from receiving the request in step S1 from the general user terminal 140, is when a request such as unloading at the destination is sent to the remote operation terminal 120 via the server 130. In addition, a case where the occupant cannot get off because the occupant is sleeping or the like is the case where, even if the vehicle arrives at the destination, the appearance of the occupant cannot be seen from the image of the vehicle compartment displayed on the display unit 120D, and the occupant does not respond to a call from the remote driver using the display unit 120D having the videophone function.

In step S15, at the discretion of the remote driver, a request for permission to end the remote driving is sent from the remote operation terminal 120 to the server 130. Then, in step S16, a request for permission to end the remote driving is sent from the server 130 to the general user terminal 140.

In step S17, the general user terminal 140 sends to the server 130 a remote driving end consent to end the remote driving service. Then, in step S18, the server 130 sends a permission to end the remote driving to the remote operation terminal 120, and the remote driving permission is removed from the remote operation terminal 120. After the remote driving permission is removed from the remote operation terminal 120, the vehicle 110 autonomously travels to a predetermined place such as a garage.

In step S19, the server 130 sends a charging and payment request to the charging and payment institution terminal 150 by ending the remote driving service. In step S20, the charging and payment for the remote driving service is made in the charging and payment institution terminal 150. In step S21, a request for payment for the remote driving service is made from the charging and payment institution terminal 150 to the general user terminal 140.

As described above, according to the present embodiment, consent between the requester of the remote driving service and the remote driver is performed via server 130. Thereby, the charging and payment processing of the remote driving service becomes possible. In particular, when a service other than moving to the destination is required, or when the occupant cannot get off because the occupant is sleeping on the vehicle 110, or the like, it is difficult to smoothly end the remote driving service. Therefore, there is a possibility that the remote driving service will be continued needlessly without notice. However, in the present embodiment, the server 130 mediates consent between the requester of the remote driving service and the remote driver. This makes it possible to end the remote driving service based on the agreement between the remote driving service requester and the remote driver. Further, in the present embodiment, a charging and payment process is performed based on an agreement between the requester of the remote driving service and the remote driver. This makes it possible to end the remote driving service smoothly.

The general user terminal in the claims corresponds to the general user terminal 140 in the detailed description. The remote operation terminal in the claims corresponds to the remote operation terminal 120 in the detailed description. The server in the claims corresponds to the server 130 in the detailed description. The charging and payment institution terminal in the claims corresponds to the charging and payment institution terminal 150 in the detailed description.

What is claimed is:

1. A remote driving service processing device comprising:
   a general user terminal by which a requester requests a remote driving service for moving a vehicle to a destination;
   a remote operation terminal by which a remote driver remotely operates the vehicle, the remote operation terminal including a display by which surroundings of the vehicle are displayed and interfaces corresponding to a steering wheel, an accelerator, a brake and a shift lever by which remote driving of the vehicle is controlled by the remote driver; and
   a server that (i) sends an end permission request signal requesting to end the remote driving service, which is received from the remote operation terminal at the request of the remote driver, to the general user terminal for consideration by the requester, the remote driver requesting to end the remote driving service when the vehicle does not satisfy a requirement for ending the remote driving service when the vehicle arrives at the destination, and (ii) when receiving a consent signal by which the requester consents to end the remote driving service from the general user terminal at the request of the requester as a response to the end permission request signal, sends the consent signal to the remote operation terminal for receipt by the remote driver and ends the remote driving service based on an agreement between the requester and the remote driver.

2. The remote driving service processing device according to claim 1, wherein a case in which the requirement for ending the remote driving service is not satisfied includes a case in which unloading from the vehicle at the destination is required and a case in which the occupant of the vehicle does not get off the vehicle at the destination.

3. The remote driving service processing device according to claim 1, further comprising:
   a charging and payment institution terminal for performing charging and payment for the remote driving service,
   wherein the server requests the charging and payment institution terminal for charging and payment of the remote driving service when receiving the consent to end the remote driving service from the general user terminal as a response to the end permission request.

4. The remote driving service processing device according to claim 2, further comprising:
   a charging and payment institution terminal for performing charging and payment for the remote driving service,
   wherein the server requests the charging and payment institution terminal for charging and payment of the remote driving service when receiving the consent to end the remote driving service from the general user terminal as a response to the end permission request.

5. The remote driving service processing device according to claim 1, wherein:
   the server receives a request signal for requesting the remote driving service by the requester from the general user terminal, sends the request signal for the remote driving service to the remote terminal, and when a request acceptance signal indicating acceptance by the remote driver is received from the remote terminal, the server gives the remote terminal a permission for remote driving of the vehicle; and
   when the server receives the consent signal to end the remote driving service from the requester, the server revokes the permission for the remote driving of the vehicle from the remote terminal.

6. The remote driving service processing device according to claim 5, wherein after the remote terminal has had the permission for remote driving revoked, the vehicle autonomously travels to a predetermined place.

7. A remote driving system comprising:
   a vehicle that is capable of being driven autonomously or remotely, the vehicle including an electronic control unit that is configured to autonomously control driving of the vehicle when the vehicle is being driven autonomously and that is configured to respond to remote signals when the vehicle is being driven remotely so as to cause the vehicle to move according to the remote signals;
   a general user terminal by which a requester requests a remote driving service for moving the vehicle to a destination;
   a remote terminal by which a remote driver remotely operates the vehicle, the remote terminal including a display by which surroundings of the vehicle are displayed and interfaces corresponding to a steering wheel, an accelerator, a brake and a shift lever by which remote driving of the vehicle is controlled by the remote driver by sending the remote signals to the vehicle; and
   a server that (i) sends an end permission request signal requesting to end the remote driving service, which is received from the remote terminal at the request of the remote driver, to the general user terminal for consideration by the requester, the remote driver requesting to end the remote driving service when the vehicle does not satisfy a requirement for ending the remote driving service when the vehicle arrives at the destination, and (ii) when receiving a consent signal by which the requester consents to end the remote driving service from the general user terminal at the request of the requester as a response to the end permission request signal, sends the consent signal to the remote terminal for receipt by the remote driver and ends the remote driving service based on an agreement between the requester and the remote driver.

8. The remote driving system according to claim 7, wherein a case in which the requirement for ending the remote driving service is not satisfied includes a case in which unloading from the vehicle at the destination is required and a case in which the occupant of the vehicle does not get off the vehicle at the destination.

9. The remote driving system according to claim 7, further comprising:
   a charging and payment institution terminal for performing charging and payment for the remote driving service,
   wherein the server requests the charging and payment institution terminal for charging and payment of the remote driving service when receiving the consent to end the remote driving service from the general user terminal as a response to the end permission request.

10. The remote driving system according to claim 7, wherein:
    the server receives a request signal for requesting the remote driving service by the requester from the general user terminal, sends the request signal for the remote driving service to the remote terminal, and when a request acceptance signal indicating acceptance by the remote driver is received from the remote terminal, the server gives the remote terminal a permission for remote driving of the vehicle; and
    when the server receives the consent signal to end the remote driving service from the requester, the server revokes the permission for the remote driving of the vehicle from the remote terminal.

11. The remote driving system according to claim 10, wherein after the remote terminal has had the permission for remote driving revoked, the vehicle autonomously travels to a predetermined place.

* * * * *